Figure 1:
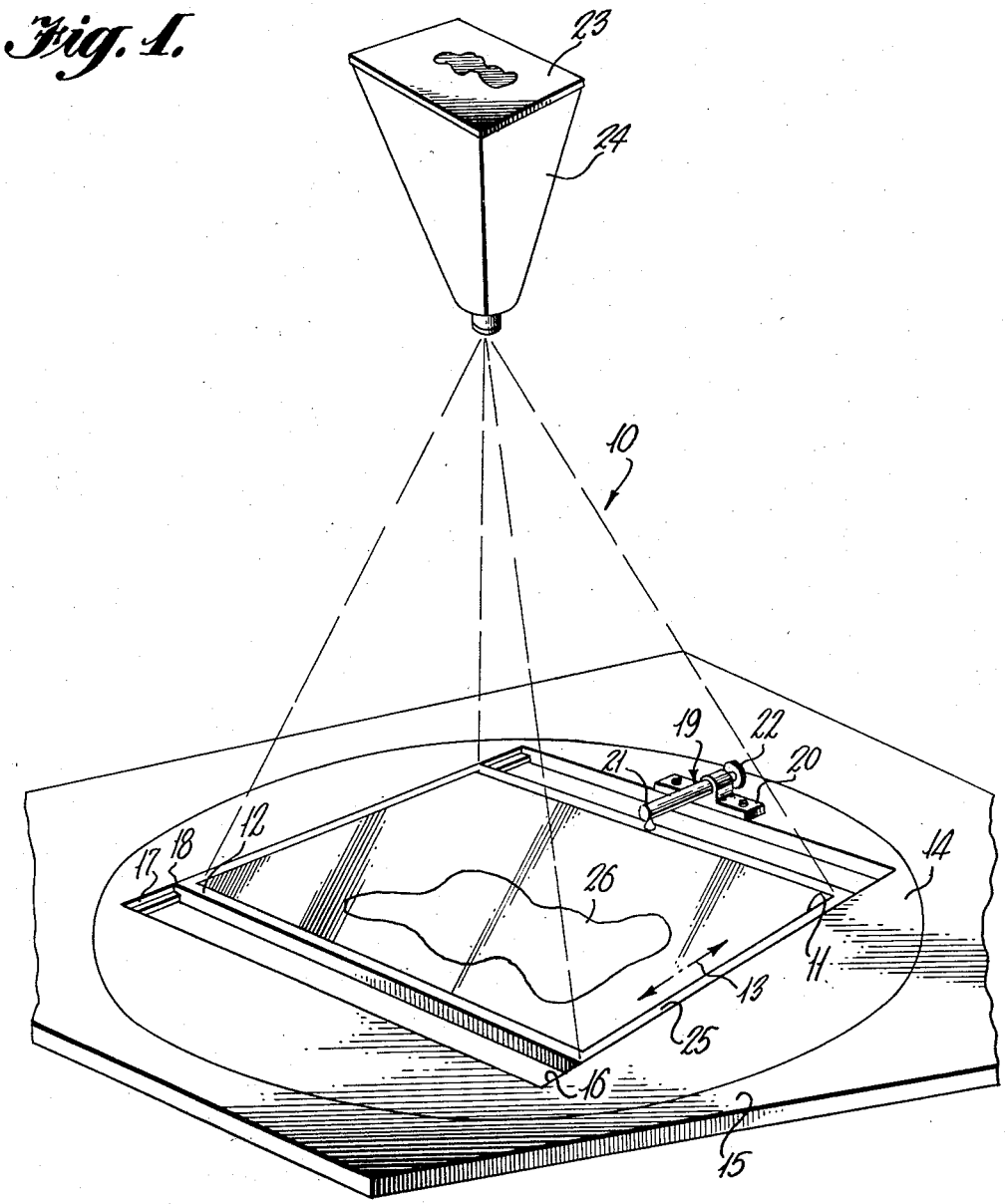

Feb. 3, 1959     F. O. SCONCE ET AL     2,871,759
CONTOUR ANALYSIS OF STEREO PAIRS OF AERIAL PHOTOGRAPHS
Filed Aug. 15, 1956     2 Sheets-Sheet 1

INVENTORS
Freddie O. Sconce and
Ross A. Taylor, Jr.
BY Mason, Fenwick & Lawrence
ATTORNEYS INVENTORS
Freddie O. Sconce and
Ross A. Taylor, Jr.

United States Patent Office 2,871,759
Patented Feb. 3, 1959

2,871,759

CONTOUR ANALYSIS OF STEREO PAIRS OF AERIAL PHOTOGRAPHS

Freddie O. Sconce, Eminence, Mo., and Ross A. Taylor, Jr., Charleston, W. Va., assignors of one-third to Stone Crest Studios, Inc., Charleston, W. Va., a corporation of West Virginia Application August 15, 1956, Serial No. 604,213

7 Claims. (Cl. 88—24)

The present invention relates to methods of analyzing stereoscopic pairs of photographs of a subject field to render visible lines of equal elevation in said field, and has particular application to the stereoscopic analysis of aerial photographs.

While the present invention has application generally to all stereoscopic inspection of photographic reproductions of objects taken from spaced points in such a manner that parallax displacement of points within the subject field are produced, the following description will be confined to the use and characteristics of the invention in connection with aerial photographs.

Stereoscopic pairs of aerial photographs are usually derived from successive photographs made from an airplane flying a selected course line or direction. The group of photographs so obtained is termed a photographic strip. Vertical photographs are usually taken in such strips with a constant overlap of approximately 60 percent between successive pictures forming the strip. The region of overlap of two such successive photographs may form the subject of a stereoscopic examination and analysis of the terrain covered by the overlap region from which sufficient contour information can be extracted to produce contour maps, terrain relief models, or other representations.

Heretofore, the common methods of deriving contour information from such aerial stereoscopic pairs of photographs has been by direct stereoscopic viewing and by photogrammetric plotting apparatus involving projection. The former method involves direct viewing of the overlap regions of the photographs through a stereoscopic instrument which isolates the images from the two photographs and directs them independently to the two eyes of the observer, where the images are mentally combined to produce an apparent three-dimensional image. An instrument such as a parallax bar is employed to provide sources of a spot of light in each of the two isolated image fields. The instrument is subject to fine adjustment of the transverse distance between the two spots to effect an apparent displacement of the elevation of the single spot sensed by the observer relative to the three-dimensional image. By adjusting the instrument to space the spots of light in accordance with selected increments of elevation relative to the minimum elevation or some reference elevation in the three-dimensional image and moving the instrument about within the image field to follow the portions of the three-dimensional ground surface image in elevation-coincidence with the spot image, the contour lines in the overlap area can be constructed. Inspection of the entire contour lines and production of a contour map of the overlap area by this method obviously requires highly skilled technicians and extensive periods of time for production of a complete contour plot. Rapid inspection of the complete contour is impossible, as the contours can only be examined in small increments and the complete contours can only be formed by tracing the incremental contour lines for each of the elevation increments.

The photogrammetric plotting technique is similar in concept to the above-described direct viewing method. It employs projectors spaced along a bar support in reduced scale relation to the stations at which a corresponding number of photographs of aerial photograph strip were exposed in flight. The photographs are converted to transparencies and imaged onto a flat plotting surface. The projectors may be adjusted individually to correspond to the optical axis of the aerial camera relative to fixed reference coordinates at the time of exposure so as to compensate for angular declination of the camera axis from true vertical in both the direction of flight, known as "tip" and in the transverse direction, known as "tilt," and to compensate for orientation of the camera photographic plate or film relative to the direction of flight, known as "yaw." When viewed with special stereoglasses which isolate the images of each adjacent pair of aerial photographs insofar as the observer is concerned, the projected images produce a three-dimensional picture of the terrain surface which was photographed. The operator then traces the ground image with a tracing table or other instrument having an adjustable elevation-indicating spot of light and a tracing marker to draw lines on a sheet disposed on the plotting surface as the tracing table is moved about within the projected image field to maintain the imaged spot of light in contact with the terrain surface image at selected elevations. Analysis of complete contour maps in this manner likewise requires highly skilled operators and involves extensive periods of time for the production of a complete contour plot. Also, since the contour lines can only be determined by small increments, study of the complete contour cannot be made until all of the contour increments are plotted.

An object of the present invention is the provision of a novel method for facilitating the rapid contour analysis of a stereoscopic pair of photographs.

Another object of the present invention is the provision of a novel method and means for inspection of a stereoscopic pair of photographs to render the complete contour information regarding the subject surface image recorded by the photographs readily visible without the use of any stereoscopic image separating means for separating and independently directing the images of the two photographs to the eyes of the observer.

Another object of the present invention is the provision of a novel method and means for readily extracting contour information from a pair of aerial photographs and the like of an area of terrain recorded from separate points in space, wherein the entire group of points of one selected elevation on the terrain surface in the overlap area of the two photographs are readily visible simultaneously as a complete contour pattern for the selected elevation.

Another object of the present invention is the provision of a novel method and means for rendering complete contour patterns for successive selected elevations of terrain readily visible as an entirety by direct visual inspection of an overlap pair of aerial photographs of the terrain.

Other objects, advantages and capabilities of the present invention will become apparent from the following detail description, taken in conjunction with the accompanying drawings, showing only preferred embodiments of the invention.

Figure 2:
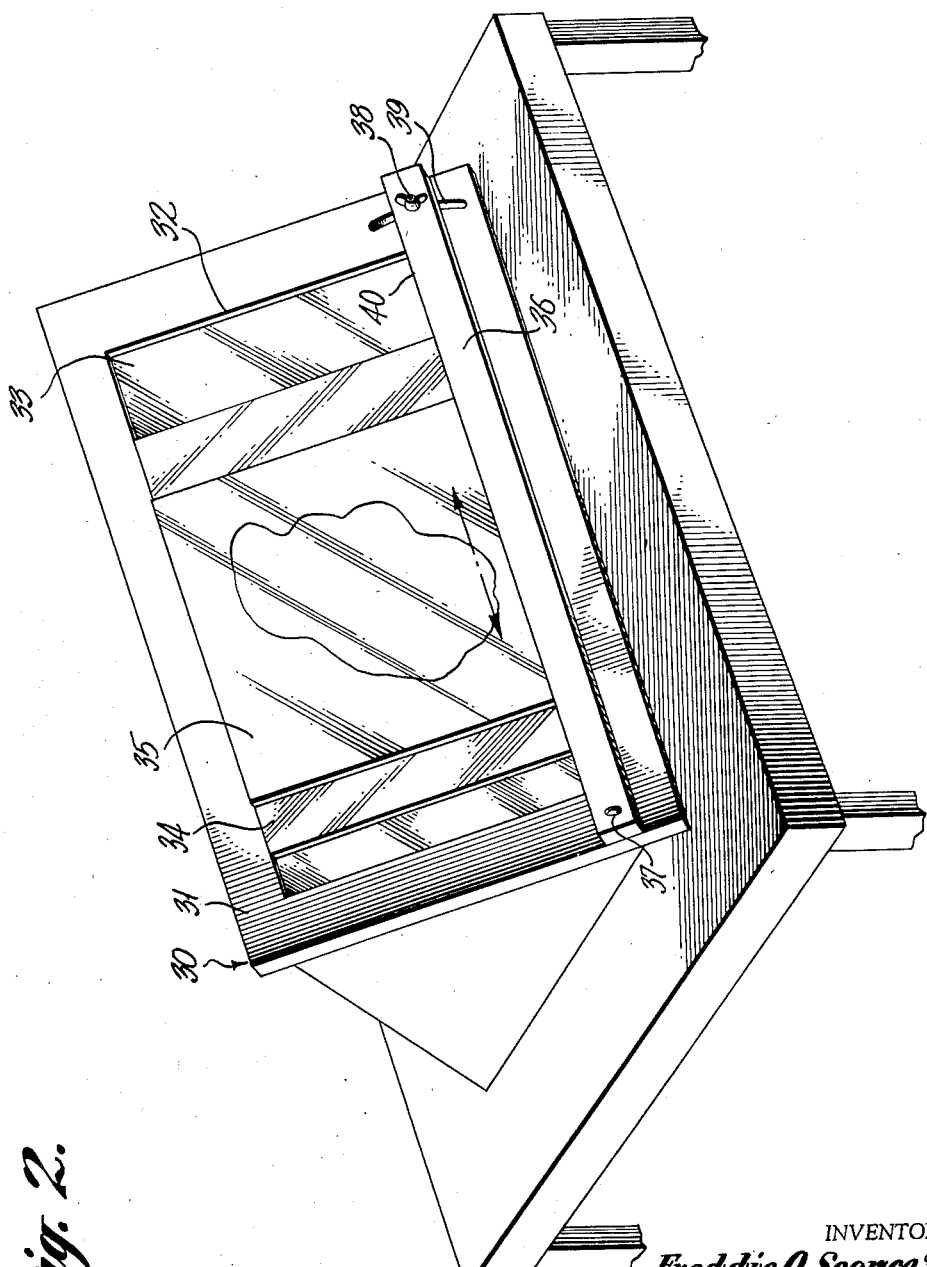

In the drawing:

Figure 1 is a schematic perspective view of apparatus arranged for practice of a preferred method for contour analysis of stereophotographs in accordance with the present invention; and, Figure 2 is a perspective schematic view of another form of apparatus arranged for practice of the method for contour analysis of stereophotographs in accordance with the present invention.

The method of the present invention, in its broader aspects, comprises the processing of a pair of photographic reproductions of a subject field taken from spaced camera stations along a preselected axis of camera movement, such as adjacent aerial photographs of a photographic strip, to render one of the photographs a negative photographic record and the other a positive photographic record. The negative and positive photographic records or images thereof, or a combination of one record and one image, are then superimposed over each other and oriented until the "flight path" axis or camera movement direction of the two photographs or images are in parallelism. With the flight path axis of the two photographs or images maintained in parallelism, the superimposed records or images are then relatively displaced while maintaining this parallelism of their flight path axes to dispose in precise registry the recorded images of a known vertical control point in both records. Such vertical control points may be the images of buildings, recognizable natural objects or formations, or like distinguishable images in the two photographs. When the superimposed and aligned images are thus arranged, the positive image of one record will tend to cancel the negative image of the other record with the result that a sharply delineated natural gray cancellation will occur for all image portions of the terrain surface which were at the same elevation as the control points. All corresponding image portions in the two records for terrain surfaces and objects at different elevations, either relative to each other or relative to the elevation of the control points, will be out of precise registry, thereby producing a blurring of the composite image of these portions of the superimposed image area. This blurring has a distinguishably different character or optical quality from the precisely registered image portions of equal elevation, due to the differences in the flat images recorded at the spaced camera stations produced by parallax differences for different elevations. It is only for those surface points which occur at the same elevation that the parallax distortion of the flat images recorded on the photographic recording medium at the two spaced camera stations will be of such character as to produce apparent sharp registry in the composite image of the superimposed records. A striking advantage of this method is that all of the contour lines for a single elevation within the composite image area of the overlap portions of the two photographs will be visible at one time, so that the complete contour characteristics for this single elevation may be analyzed as a whole without necessitating the trace plotting of each small increment making up the complete contour plot for a single elevation. By relatively displacing the two photographic records or images from such initial condition of registry and along only the flight path axis of the records or images, the sharp neutral gray cancellation images shift in elevation to permit examination of the complete contour lines for other elevations above or below that of the control points. Since relative displacement of the two photographic records or images along their flight path axis progressively changes the terrain elevation at which non-blurred registry will occur, the contour changes between selected elevations can be analyzed in a smooth continuous fashion progressing from one elevation to the other instead of in discrete increments, the latter being the procedure incident to usual contour plotting schemes. Therefore, the contour variations between such discrete elevation increments may be readily inspected.

There is illustrated in Figure 1 one preferred form of apparatus indicated generally by reference character 10, for practicing the present invention. In the practice of this preferred method, one of an adjacent pair of aerial photographs from a photographic strip is transformed into an enlarged positive photographic print 11 and is mounted in a suitable print supporting member 12 which may be in the form of a conventional photographic plate holder or frame or a flat plate onto which the positive print 11 is removably secured. The photographic print supporting member 12 is supported for sliding adjustment within its plane along an axis parallel to one edge of the supporting member 12, for example the longitudinal axis indicated by the arrow 13 in Figure 1, in a circular mounting disk 14 rotatably supported on a table 15. The rotatable supporting disk 14 is provided with a rectangular opening 16 which preferably corresponds in width to the width of the print supporting member 12 and is of greater length than the print supporting member 12 to receive the print supporting member 12 therein and permit adjustment thereof along the longitudinal axis 13. The edges of the rectangular opening 16 may, for example, be provided with rabbets 17 in the upper edges thereof adapted to cooperate with laterally projecting tongues 18 on the edges of the print supporting member 12 to slidably support the print supporting member 12 in coplanar relation with the rotatable supporting disk 14.

Preferably, a micrometer adjustment mechanism 19 having a journalling member 20 affixed to the rotatable supporting disk 14 adjacent an edge of the opening 17 for housing an axially adjustable rod 21 connected to the print supporting member 12 and controlled by an indexed knob 22 is provided to effect fine horizontal adjustment of the print supporting member 12 along the longitudinal axis 13.

The other aerial photograph which was taken from the next preceding or succeeding camera station relative to that of the positive print 11 is transformed into a negative photographic transparency 23 and is positioned in a photographic projector 24 which may conveniently take the form of a conventional photographic enlarger projector head or the like to project and image the photographic transparency 23 onto the surface of the positive photographic print 11. The projector 24 is positioned a sufficient distance above the surface of the positive photographic print 11 so as to enlarge the projected image of the transparency 23 in precise correspondence with the enlargement of the positive photographic print 11. The projector 24 is supported on any suitable stand or support by conventional means, such as a universal coupling or the like, to permit the axis of the projector 24 to be tilted relative to the vertical to compensate for "tilt" and "tip" of the camera axis at the time of exposure, and the projector 24 may be rotated about its optical axis to compensate for "yaw" or "crabbing" of the aircraft at the time of exposure. The rotatable supporting disk 14 is then rotated about its axis to dispose the edge 25 of the positive photographic print 11 parallel to the flight path axis of the projected image of the negative transparency 23. In normal procedure, the photosensitive paper which was exposed to form the positive photographic print 11 will have been so oriented during its exposure in the enlarger so as to arrange the flight path axis of its recorded image parallel to the edge 25. The projected image of the negative transparency 23 and the positive photographic print 11 are then displaced perpendicular to the axis 13 and parallel to the axis 13 to dispose selected control points in the projected image of the transparency 23 and the positive print 11, such as the image of a building or the like, in precise registry. The elevation of the control points will have been precisely determined in the field. The reading of the indexed knob 22 of the micrometer adjusting mechanism 19 is then noted. The micrometer adjusting mechanism 19 will preferably be similar in character to the micrometer screw adjusting mechanism of conventional parallax bars and the like so that the departures in micrometer reading from the control point micrometer reading when the projected negative image and positive print are relatively displaced from control point registry can be calibrated in terms of elevation. Accordingly, adjustment of the micrometer adjusting mechanism 19 to shift the print supporting member 12 and the positive print 11 along the axis 13, while the projector 24 remains fixed, will successively render visible, in the form of sharp neutral gray lines in the composite image, the complete contour lines, as indicated for illustrative purposes at 26, for single elevations corresponding to the micrometer setting.

Another form of apparatus for practicing the method of the present invention is illustrated in Figure 2. This apparatus takes the form of an illuminated housing 30, preferably having an inclined light table 31 provided with a rectangular opening 32 of greater size than the photographic records to be viewed, in which there is preferably seated a glass pane 33 or like transparent supporting surface. In the practice of the method with this apparatus, one of a pair of adjacent aerial photographic negatives, indicated by the reference character 34, is processed to obtain a transparent negative image, and the other of the adjacent pair of photographs is processed to obtain a transparent positive image, indicated by the reference character 35. A diffused or a collimated light source is preferably provided within the illuminated housing 30 to illuminate the transparencies 34, 35. The transparencies 34, 35 will preferably have been exposed in such a way, during their reduction from the original photographic negatives, that the axis of camera movement between the two camera exposure stations is parallel to the lower edges of the tranparencies 34, 35. The negative transparency 34 is then fixed on the transparent supporting surface 33 by any suitable means, such as reuseable adhesive tape or the like, with the axis of camera movement arranged parallel to the lower edge of the illumination opening 32. The positive transparency 35 is then placed over the negative transparency 34 and is displaced relative to the negative transparency 34 along an axis parallel to the vertical or lateral edges of the transparency 34 so that images of objects appearing in both transparencies are in line with each other along the flight path axis or direction of camera movement. A straight edge guide bar 36 is preferably supported on the light table 31 with one end thereof pivoted, as indicated at 37, to the light table and the other end provided with an adjustable clamping screw 38 extending through an arcuate slot 39 in the light table 31 to permit adjustment of the upper guide edge 40 for the lower edge of the positive transparency 35 to guide the positive transparency for movement relative to the negative transparency 34 in such a way as to compensate for "yaw" or "crabbing" of the aircraft. The positive transparency 35 is then shifted relative to the fixed negative transparency 34 in parallelism with the guide edge 40 to position selected vertical control points in both images in registry with each other in the same manner as that described in connection with the apparatus in Figure 1.

In this condition, all points of the same elevation throughout the overlapping transparencies 34, 35 will appear as a sharp neutral gray line which is readily distinguishable from the blurred composite images resulting from the points of different elevation which have suffered parallax distortion. Any movement of the positive transparency 35 along the flight line relative to the negative transparency 34 will cause the distinguishable sharp neutral gray pattern to change with the contour of the terrain surface photograph, so that the contour information regarding the entire terrain surface photograph can be readily determined without necessitating a time-consuming plot of the contour lines increment by increment.

As it is easier to distinguish the contour pattern defined by the sharp neutral gray cancellation lines when there is relative motion between the negative and positive images, reading of the contour information from the photographic images can be facilitated by associating a vibrator with the positive transparency 35, in the case of the apparatus of Figure 2, or with the table 15, in the case of the apparatus of Figure 1, to vibrate the positive image along the direction of the flight path axis of the image. Distinguishment of the contour lines can also be facilitated by forming the negative transparency in either embodiment of one base color only and the positive print 11 or transparency 35 of a different color which will produce a different color distinguishable from either of the base colors at the points of precise registry representing a single elevation.

Instead of directly viewing the transparencies 34 and 35 in the embodiment of Figure 2, the image of the negative transparency 34 may be projected onto a flat surface by one projector similar to the projector 24 of Figure 1 and the positive transparency 35 may may be projected onto the same image area by a second projector similar to the projector 24, and the contour information derived in substantially the same manner as described in connection with Figures 1 and 2 by relative adjustment and displacement of the two projectors.

While several preferred embodiments have been specifically shown and described herein, it is apparent that other modifications may be made in the invention without departing from the spirit and scope thereof, and it is desired, therefore, that only such limitations shall be placed thereon as are imposed by the prior art and are set forth in the appended claims.

We claim:

1. The method of rendering directly visible to the naked eye contour lines of the surfaces of objects imaged in a pair of photographic records taken from laterally spaced camera stations comprising the steps of superimposing a negative photographic image of one of said photographic records and a positive photographic image of the other of said photographic records over each other at a substantially common image plane, orienting said superimposed images within said common plane relative to each other to arrange the axes of each of said images aligned with the axis of camera station displacement in parallelism, relatively displacing said superimposed images within said common plane while maintaining the said camera station displacement axes of said images in parallelism with each other to dispose in apparent registry the recorded images of known vertical control points in each of said images of a selected elevation and produce a contour line pattern image for such selected elevation from said apparent registry which is visually distinguishable from the images of all objects of different elevation, and relatively shifting said superimposed images rectilinearly along said parallel axes to shift the registry contour pattern of said superimposed images to different selected subject field elevations.

2. The method of processing a pair of photographic records of a subject field taken from laterally spaced camera stations to render contour lines of the surfaces of objects in said field directly visible to the naked eye comprising the steps of superimposing a negative photographic image of one of said photographic records and a positive photographic image of the other of said photographic records over each other at a substantially common image plane, orienting said images within said common plane relative to each other to arrange the axes of said images aligned with the direction of camera station displacement of said pair of records in parallelism, relatively displacing said superimposed images within said common plane while maintaining said axes of said images in parallelism to dispose the recorded images of known vertical control points in each of said superimposed images in alignment along axes of said images aligned with the direction of camera station displacement, and displacing one of said images rectilinearly relative to the other along said parallel axes of said superimposed images to produce directly observable distinguishable registry image contour line patterns of the corresponding object images of objects of equal elevation on the subject field surfaces for different elevations in accordance with the relative displacement of said superimposed images.

3. The method of rendering directly visible to the naked eye contour lines of a terrain surface from an adjacent pair of aerial photographic records of said terrain surface taken from spaced camera stations along a flight path comprising the steps of processing said adjacent pair of photographic records to produce a negative photographic image from one of said records and a positive photographic image from the other of said records, superimposing said images over each other in a substantially common image plane, orienting said images within said image plane relative to each other to arrange the flight path axes of said images in parallelism, displacing one of said images relative to the other within said plane while maintaining said flight path axes of said images in parallelism to dispose in precise registry the recorded images of known vertical control points in each of said images, and displacing one of said images rectilinearly relative to the other along said flight path axes of said images to produce from apparent composite image registry of all terrain surface point images of one elevation and image-distorting non-registry of all other terrain surface point images a directly visible distinguishable contour line of the terrain surface for different terrain elevations at different relative positions of said superimposed images.

4. The method of rendering directly visible to the naked eye contour lines of a terrain surface from an adjacent pair of aerial photographic records of said terrain surface taken from spaced camera stations along a flight path comprising the steps of processing said adjacent pair of photographic records to produce a negative photographic image from one of said records and a positive photographic image from the other of said records, superimposing said images over each other in a substantially common image plane, orienting said images within said image plane relative to each other to arrange the flight path axes of said images in parallelism, relatively displacing the superimposed images within said common plane while maintaining their flight path axes in parallelism to dispose the recorded images of known vertical control points in each of said superimposed images in alignment along an axis parallel to said flight path axes of said images, relatively displacing said images in the direction of said flight path axes of said images to produce a composite image wherein the corresponding images of terrain surface points of equal elevation appear in registry and the surface point images of all other portions of the terrain surface appear in non-registry to form a visually distinguishable registry pattern of the contour line of the terrain surface for a selected elevation, which is directly visible to the naked eye and shifting one of said superimposed images rectilinearly relative to the other along said parallel flight path axes of said images to shift the registry pattern of terrain surface contour lines in said composite image to different terrain surface elevations at different relative positions of said superimposed images.

5. The method of rendering directly visible to the naked eye contour lines of a terrain surface from an adjacent pair of aerial photographic records of said terrain surface taken from spaced camera stations along a flight path comprising the steps of processing said adjacent pair of photographic records to produce a negative photographic image from one of said records and a positive photographic image from the other of said records, superimposing said images over each other in a substantially common image plane, orienting said images within said image plane relative to each other to arrange the flight path axes of said images in parallelism, displacing one of said images relative to the other within said plane while maintaining said flight path axes of said images in parallelism to dispose recorded images of known vertical control points in each of said superimposed images in precise registry to establish a control point reference of known elevation and displacing one of said images rectilinearly relative to the other along their flight path axes to produce from apparent composite image registry of all terrain surface point images of one elevation and image-distorting non-registry of all other terrain surface point images a distinguishable image which is directly visible to the naked eye depicting the contour pattern of the terrain surface for terrain elevation bearing a determinable relation to the relative displacement of said superimposed images from their control point reference positions.

6. The method of rendering directly visible to the naked eye contour lines of a terrain surface from an adjacent pair of aerial photographic records of said terrain surface taken from spaced camera stations along a flight path comprising the steps of producing a positive photographic print from one of said photographic records and positioning the same in a flat plane, projecting a negative transparency of the other pair of photographic records onto said positive photographic print to superimpose the image of said negative transparency on said print, orienting said negative transparency image relative to said positive print to arrange the flight path axes of said transparency and said print in parallelism, displacing said negative transparency projected image relative to said print while maintaining said flight path axes in parallelism to dispose the recorded images of known vertical control points in said projected negative image and said positive print in alignment with each other along an axis parallel to said flight path axis, displacing said projected negative image relative to said positive print in the direction of said flight path axes to produce a composite image from said projected negative image and said positive print wherein the corresponding images of terrain surface points of equal elevation appear in registry and the surface point images of all other portions of the terrain surface appear in composite-image-distorting non-registry to form a visually distinguishable registry pattern which is directly visible to the naked eye depicting the contour line of the terrain surface for a selected elevation, and shifting said projected negative image rectilinearly relative to said positive print along said flight path axes to shift the contour line depicting registry pattern of said composite image to different terrain surface elevations as the relative displacement of said projected negative image and said positive print is varied.

7. The method of rendering directly visible to the naked eye contour lines of a terrain surface from an adjacent pair of aerial photographic records of said terrain surface taken from spaced camera stations along a flight path comprising the steps of positioning a negative photographic transparency of one of said photographic records on a flat surface, superimposing a positive photographic transparency of the other of said pair of photographic records over said negative transparency in overlying surface contact with said negative transparency, illuminating said overlying positive and negative transparencies for direct viewing of the transparency images, orienting said transparencies one relative to the other to arrange the flight path axes of said transparencies in parallelism, relatively displacing said transparencies within their respective planes while maintaining their flight path axes in parallelism to dispose the recorded images of known vertical control points in each of said transparencies in alignment with each other along an axis parallel to said flight path axes of said transparencies, relatively displacing said transparencies within their respective planes in the direction of said flight path axes of said transparencies to produce a composite image from their recorded images wherein the corresponding images of terrain surface points of equal elevation appear in registry and the surface point images of all other portions of the terrain surface appear in image-distorting non-registry to form a visually distinguishable registry pattern which is directly visible to the naked eye depicting the contour line of the terrain surface for a selected elevation, and shifting one of said transparencies rectilinearly relative to the other along said parallel flight path axes to shift the contour depicting registry pattern in said composite image to different terrain surface elevations upon variation of the relative displacement of said pair of transparencies.

References Cited in the file of this patent

UNITED STATES PATENTS

| | | |
|---|---|---|
| 563,303 | Oehring et al. | July 7, 1896 |
| 1,087,725 | Carpentier | Feb. 17, 1914 |
| 1,092,545 | Snapp | Apr. 7, 1914 |
| 1,260,221 | McCormick | Mar. 19, 1918 |
| 2,083,215 | Balaban | June 8, 1937 |
| 2,210,333 | Kroner | Aug. 6, 1940 |
| 2,314,222 | Konig | Mar. 16, 1943 |
| 2,365,613 | Wibner et al. | Dec. 19, 1944 |
| 2,406,451 | Borkenstein | Aug. 27, 1946 |
| 2,449,542 | Ayers et al. | Sept. 21, 1948 |
| 2,499,351 | Bretz | Mar. 7, 1950 |
| 2,526,682 | Mulberger et al. | Oct. 24, 1950 |